(12) United States Patent
Paaredi et al.

(10) Patent No.: US 11,436,313 B2
(45) Date of Patent: Sep. 6, 2022

(54) METHOD, SYSTEM, AND COMPUTER PROGRAM PRODUCT FOR AUTHENTICATING A DEVICE

(71) Applicant: Visa International Service Association, San Francisco, CA (US)

(72) Inventors: Muthyam Reddy Paaredi, Bangalore (IN); Jerry Jose Zachariah, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 146 days.

(21) Appl. No.: 17/046,448

(22) PCT Filed: Apr. 10, 2018

(86) PCT No.: PCT/US2018/026872
§ 371 (c)(1),
(2) Date: Oct. 9, 2020

(87) PCT Pub. No.: WO2019/199276
PCT Pub. Date: Oct. 17, 2019

(65) Prior Publication Data
US 2021/0150018 A1    May 20, 2021

(51) Int. Cl.
*G06F 21/44* (2013.01)
*G06F 21/62* (2013.01)
(Continued)

(52) U.S. Cl.
CPC .......... *G06F 21/44* (2013.01); *G06F 21/6218* (2013.01); *H04L 9/0816* (2013.01); *H04L 9/30* (2013.01); *H04L 63/08* (2013.01)

(58) Field of Classification Search
None
See application file for complete search history.

(56) References Cited

U.S. PATENT DOCUMENTS 7,813,512 B2 * 10/2010 Futa ...................... H04L 9/0844
713/169
2004/0143762 A1    7/2004 Audebert et al.
(Continued)

FOREIGN PATENT DOCUMENTS

WO    WO-2010010430 A2 *  1/2010  ........... H04L 9/0844
WO    WO-2014106148 A1 *  7/2014  ......... H04L 63/0442

*Primary Examiner* — Benjamin E Lanier
(74) *Attorney, Agent, or Firm* — The Webb Law Firm

(57) ABSTRACT

Provided is a method for authenticating a device. The method may include coupling a first device to an interaction database that is connected to a second device. The first and second devices store first group public and private keys. The second device also stores second device public and private keys. The first device transmits to a remote computer system a first message encrypted with a remote computer system public key that includes challenge data and response data encrypted with the first group public key and authentication data. The second device receives from the remote computer system a second message including the encrypted challenge data. The second device transmits to the remote computer system a third message including the response data. In response to receiving an authentication message, interaction may be permitted between the first device and remote computer system. A system and computer program product are also disclosed.

19 Claims, 6 Drawing Sheets

(51) Int. Cl.
*H04L 9/08* (2006.01)
*H04L 9/30* (2006.01)
*H04L 9/40* (2022.01)

(56) References Cited

U.S. PATENT DOCUMENTS

| | | | |
|---|---|---|---|
| 2011/0154025 A1* | 6/2011 | Spalka | H04L 9/3236 713/182 |
| 2014/0137219 A1 | 5/2014 | Castro et al. | |
| 2015/0149767 A1 | 5/2015 | Oualha et al. | |
| 2015/0318998 A1 | 11/2015 | Erlikhman et al. | |
| 2016/0149908 A1 | 5/2016 | Unagami et al. | |

* cited by examiner

METHOD, SYSTEM, AND COMPUTER PROGRAM PRODUCT FOR AUTHENTICATING A DEVICE

CROSS-REFERENCE TO RELATED APPLICATION

This application is the United States national phase of International Application No. PCT/US2018/026872 filed Apr. 10, 2018, the disclosure of which is hereby incorporated by reference in its entirety.

BACKGROUND

1. Technical Field

This disclosure relates generally to methods, systems, and products for authentication and, in some non-limiting embodiments or aspects, to a method, system, and computer program product for authenticating a device.

2. Technical Considerations

Certain devices may include "smart" features or some form of intelligence, e.g., processing of information and/or network connectivity. Some such devices may operate with limited or no support from humans, at least for limited periods of time. For example, the Internet of Things (IoT) may include many devices (potentially billions of devices or more), each of which may be connected to the Internet. However, such connected devices pose potential security threats. For example, when a first device wants to interact with something else (e.g., a second device, a remote computer system, a database, and/or the like), such interaction may involve communications over one or more networks. Such communications may be intercepted and/or susceptible to an attack (e.g., by an eavesdropper, a man-in-the-middle, and/or the like). Additionally or alternatively, a device may be accessible to and/or compromised by an attacker trying to gain access not just to information thereon but to other devices and/or systems connected thereto.

Traditional authentication techniques (e.g., a static password) may be ineffective to prevent such attacks, for example, because an attacker may be able to simply repeat a set of communications and/or otherwise circumvent the technique. Certain multi-factor authentication techniques may reduce security vulnerabilities. For examples, such techniques may use a combination of a (traditional) password and other types of authentication, such as a one-time password (OTP) or a random or pseudorandom passcode. However, such techniques typically require some level of human effort and/or input, which may be inconvenient and/or time consuming and may not be desirable and/or feasible for applications including a large number of interconnected devices (e.g., IoT-based applications and/or the like).

SUMMARY

According to non-limiting embodiments or aspects, provided is a method for authenticating a device. In some non-limiting embodiments or aspects, a method for authenticating a device may include coupling a first device to an interaction database, the interaction database coupled to a second device. The interaction database may store interaction data. The first device may store a first group public key, a first group private key, a first device public key, and a first device private key. The second device may store the first group public key, the first group private key, a second device public key, and a second device private key. A first message may be transmitted to a remote computer system from the first device. The first message may include challenge data associated with a challenge question corresponding to the interaction data, response data associated with a required response to the challenge question corresponding to the interaction data, and authentication data associated with the first device, and the challenge data and the response data each may be encrypted with the first group public key. The first message may be encrypted with a remote computer system public key of the remote computer system. A second message may be received at the second device from the remote computer system. The second message may include the challenge data encrypted with the first group public key from the first message. The second message may be encrypted with the second device public key. A third message may be transmitted to the remote computer system from the second device. The third message may include response data associated with the required response to the challenge question corresponding to the interaction data, and the response data may be encrypted with the first group public key. The third message may be encrypted with the remote computer system public key. In response to receiving an authentication message from the remote computer system indicating that the first device has been authenticated by the remote computer system, interaction may be permitted between the first device and the remote computer system.

In some non-limiting embodiments or aspects, the interaction data may include data associated with at least one interaction, and each interaction may include at least one of a payment transaction or a communication. For example, the interaction(s) may include at least one of an interaction between the second device and the remote computer system, an interaction between the second device and a second remote computer system, an interaction between a third device coupled to the interaction database and the remote computer system, an interaction between the third device and the second remote computer system, or a fictional interaction between a fictional device and a fictional remote computer system.

In some non-limiting embodiments or aspects, the first device may determine the challenge data and the response data based on the interaction data in the interaction database before transmitting the first message. Additionally or alternatively, in response to receiving the second message, the second device may determine the response data based on the challenge data from the second message and the interaction data in the interaction database before transmitting the third message.

In some non-limiting embodiments or aspects, the interaction database, the first device, and the second device are each coupled to a first network. Additionally or alternatively, the first device, the second device, and the remote computer system each may be coupled to a second network separate from the first network. For example, the first message may be transmitted to the remote computer system from the first device over the second network, the second message may be received at the second device from the remote computer system over the second network, and/or the third message may be transmitted to the remote computer system from the second device over the second network.

In some non-limiting embodiments or aspects, the remote computer system may authenticate the first device based on a comparison of the response data from the first message and the response data from the third message. Additionally or alternatively, in response to receiving an authentication message from the remote computer system indicating that the first device has not been authenticated by the remote computer system, interaction between the first device and the remote computer system may be prevented.

In some non-limiting embodiments, the interaction database may store the challenge data in response to receiving the second message with the challenge data.

According to non-limiting embodiments or aspects, provided is a system for authenticating a device. In some non-limiting embodiments or aspects, the system for authenticating a device may include an interaction database configured to store interaction data. A first device may be coupled to the interaction database, and the first device may store a first group public key, a first group private key, a first device public key, and a first device private key. A second device may be coupled to the interaction database, and the second device may store the first group public key, the first group private key, a second device public key, and a second device private key. The first device may transmit a first message to a remote computer system, and the first message may include challenge data associated with a challenge question corresponding to the interaction data, response data associated with a required response to the challenge question corresponding to the interaction data, and authentication data associated with the first device, and the challenge data and the response data each may be encrypted with the first group public key. The first message may be encrypted with a remote computer system public key of the remote computer system. The second device may receive a second message from the remote computer system, and the second message may include the challenge data encrypted with the first group public key from the first message. The second message may be encrypted with the second device public key. The second device may transmit a third message to the remote computer system, and the third message may include response data associated with the required response to the challenge question corresponding to the interaction data, and the response data may be encrypted with the first group public key. The third message may be encrypted with the remote computer system public key. In response to receiving an authentication message from the remote computer system indicating that the first device has been authenticated by the remote computer system, the first device may permit interaction between the first device and the remote computer system.

In some non-limiting embodiments or aspects, the interaction data may include data associated with at least one interaction, and each interaction may include at least one of a payment transaction or a communication. For example, the interaction(s) may include at least one of an interaction between the second device and the remote computer system, an interaction between the second device and a second remote computer system, an interaction between a third device coupled to the interaction database and the remote computer system, an interaction between the third device and the second remote computer system, or a fictional interaction between a fictional device and a fictional remote computer system.

In some non-limiting embodiments or aspects, the first device may determine the challenge data and the response data based on the interaction data in the interaction database before transmitting the first message. Additionally or alternatively, in response to receiving the second message, the second device may determine the response data based on the challenge data from the second message and the interaction data in the interaction database before transmitting the third message.

In some non-limiting embodiments or aspects, the interaction database, the first device, and the second device are each coupled to a first network. Additionally or alternatively, the first device, the second device, and the remote computer system each may be coupled to a second network separate from the first network. For example, the first message may be transmitted to the remote computer system from the first device over the second network, the second message may be received at the second device from the remote computer system over the second network, and/or the third message may be transmitted to the remote computer system from the second device over the second network.

In some non-limiting embodiments or aspects, the remote computer system may authenticate the first device based on a comparison of the response data from the first message and the response data from the third message. Additionally or alternatively, in response to receiving an authentication message from the remote computer system indicating that the first device has not been authenticated by the remote computer system, interaction between the first device and the remote computer system may be prevented (e.g., by the first device and/or the remote computer system).

In some non-limiting embodiments, the interaction database may store the challenge data in response to receiving the second message with the challenge data.

According to non-limiting embodiments or aspects, provided is a computer program product for authenticating a device. The computer program product may include at least one non-transitory computer-readable medium including one or more instructions that, when executed by at least one processor, cause the at least one processor to couple a first device to an interaction database, which may be coupled to a second device. The interaction database may store interaction data. The first device may store a first group public key, a first group private key, a first device public key, and a first device private key. The second device may store the first group public key, the first group private key, a second device public key, and a second device private key. A first message may be transmitted to a remote computer system from the first device. The first message may include challenge data associated with a challenge question corresponding to the interaction data, response data associated with a required response to the challenge question corresponding to the interaction data, and authentication data associated with the first device, and the challenge data and the response data each may be encrypted with the first group public key. The first message may be encrypted with a remote computer system public key of the remote computer system. In response to the first message, a second message may be received at the second device from the remote computer system, and the second message may include the challenge data encrypted with the first group public key from the first message. The second message may be encrypted with the second device public key. In response to the second message, a third message may be transmitted to the remote computer system from the second device, and the third message may include response data associated with the required response to the challenge question corresponding to the interaction data, and the response data may be encrypted with the first group public key. The third message may be encrypted with the remote computer system public key. In response to receiving an authentication message from the remote computer system indicating that the first device has been authenticated by the remote computer system, interaction may be permitted between the first device and the remote computer system.

In some non-limiting embodiments or aspects, the interaction data may include data associated with at least one interaction, and each interaction may include at least one of a payment transaction or a communication. For example, the interaction(s) may include at least one of an interaction between the second device and the remote computer system, an interaction between the second device and a second remote computer system, an interaction between a third device coupled to the interaction database and the remote computer system, an interaction between the third device and the second remote computer system, or a fictional interaction between a fictional device and a fictional remote computer system.

In some non-limiting embodiments or aspects, the challenge data and the response data may be determined based on the interaction data in the interaction database before transmitting the first message. Additionally or alternatively, in response to receiving the second message, the second device may determine the response data based on the challenge data from the second message and the interaction data in the interaction database before transmitting the third message.

In some non-limiting embodiments or aspects, the interaction database, the first device, and the second device are each coupled to a first network. Additionally or alternatively, the first device, the second device, and the remote computer system each may be coupled to a second network separate from the first network. For example, the first message may be transmitted to the remote computer system from the first device over the second network, the second message may be received at the second device from the remote computer system over the second network, and/or the third message may be transmitted to the remote computer system from the second device over the second network.

In some non-limiting embodiments or aspects, in response to receiving the third message, the remote computer system may authenticate the first device based on a comparison of the response data from the first message and the response data from the third message. Additionally or alternatively, in response to receiving an authentication message from the remote computer system indicating that the first device has not been authenticated by the remote computer system, interaction between the first device and the remote computer system may be prevented.

In some non-limiting embodiments, the interaction database may store the challenge data in response to receiving the second message with the challenge data.

According to non-limiting embodiments or aspects, provided is a method for authenticating a device. In some non-limiting embodiments or aspects, a method for authenticating a device may include coupling a first device to an interaction database, which may be coupled to a second device. The interaction database may store interaction data. The first device may store a first group public key, a first group private key, a first device public key, and a first device private key. The second device may store the first group public key, the first group private key, a second device public key, and a second device private key. A first message may be transmitted to a first remote computer system from the first device. The first message may include challenge data associated with a challenge question corresponding to the interaction data, first remote computer system public key data associated with a first remote computer system public key, response data associated with a required response to the challenge question corresponding to the interaction data, and authentication data associated with the first device, and the challenge data, the first remote computer system public key data, and the response data each may be encrypted with the first group public key. The first message may be encrypted with the first remote computer system public key of the first remote computer system. A second message may be received at the second device from a second remote computer system. The second message may include the challenge data and the first remote computer system public key data encrypted with the first group public key from the first message, and the second message may be encrypted with the second device public key. A third message may be transmitted to the second remote computer system from the second device. The third message may include response data associated with the required response to the challenge question corresponding to the interaction data, and the response data may be encrypted with the first group public key. The third message may be encrypted with the first remote computer system public key from the second message. In response to receiving an authentication message from the second remote computer system indicating that the first device has not been authenticated by the second remote computer system, interaction may be prevented between the first device and at least one of the first remote computer system and the second remote computer system.

According to non-limiting embodiments or aspects, provided is a system for authenticating a device. In some non-limiting embodiments or aspects, the system for authenticating a device may include an interaction database configured to store interaction data. A first device may be coupled to the interaction database, and the first device may store a first group public key, a first group private key, a first device public key, and a first device private key. A second device may be coupled to the interaction database, and the second device may store the first group public key, the first group private key, a second device public key, and a second device private key. The first device may transmit a first message to a remote computer system. The first message may include challenge data associated with a challenge question corresponding to the interaction data, first remote computer system public key data associated with a first remote computer system public key, response data associated with a required response to the challenge question corresponding to the interaction data, and authentication data associated with the first device, and the challenge data, the first remote computer system public key data, and the response data each may be encrypted with the first group public key. The first message may be encrypted with the first remote computer system public key of the remote computer system. The second device may receive a second message from a second remote computer system. The second message may include the challenge data and the first remote computer system public key data encrypted with the first group public key from the first message. The second message may be encrypted with the second device public key. The second device may transmit a third message to the second remote computer system. The third message may include response data associated with the required response to the challenge question corresponding to the interaction data, and the response data may be encrypted with the first group public key. The third message may be encrypted with the first remote computer system public key from the second message. In response to receiving an authentication message from the second remote computer system indicating that the first device has not been authenticated by the remote computer system, the first device may prevent interaction between the first device and at least one of the first remote computer system and the second remote computer system.

According to non-limiting embodiments or aspects, provided is a computer program product for authenticating a device. The computer program product may include at least one non-transitory computer-readable medium including one or more instructions that, when executed by at least one processor, cause the at least one processor to couple a first device to an interaction database, which may be coupled to a second device. The interaction database may store interaction data. The first device may store a first group public key, a first group private key, a first device public key, and a first device private key. The second device may store the first group public key, the first group private key, a second device public key, and a second device private key. A first message may be transmitted to a first remote computer system from the first device. The first message may include challenge data associated with a challenge question corresponding to the interaction data, first remote computer system public key data associated with a first remote computer system public key, response data associated with a required response to the challenge question corresponding to the interaction data, and authentication data associated with the first device, and the challenge data, the first remote computer system public key data, and the response data each may be encrypted with the first group public key. The first message may be encrypted with the first remote computer system public key of the first remote computer system. In response to the first message, a second message may be received at the second device from a second remote computer system. The second message may include the challenge data and the first remote computer system public key data encrypted with the first group public key from the first message. The second message may be encrypted with the second device public key. In response to the second message, a third message may be transmitted to the second remote computer system from the second device. The third message may include response data associated with the required response to the challenge question corresponding to the interaction data, the response data encrypted with the first group public key. The third message may be encrypted with the first remote computer system public key from the second message. In response to receiving an authentication message from the second remote computer system indicating that the first device has not been authenticated by the second remote computer system, interaction may be prevented between the first device and at least one of the first remote computer system and the second remote computer system.

Further non-limiting embodiments or aspects are set forth in the following numbered clauses:

Clause 1: A method for authenticating a device, comprising: coupling a first device to an interaction database, the interaction database coupled to a second device, the interaction database storing interaction data, the first device storing a first group public key, a first group private key, a first device public key, and a first device private key, the second device storing the first group public key, the first group private key, a second device public key, and a second device private key; transmitting a first message to a remote computer system from the first device, the first message comprising challenge data associated with a challenge question corresponding to the interaction data, response data associated with a required response to the challenge question corresponding to the interaction data, and authentication data associated with the first device, the challenge data and the response data each encrypted with the first group public key, the first message encrypted with a remote computer system public key of the remote computer system; receiving a second message at the second device from the remote computer system, the second message comprising the challenge data encrypted with the first group public key from the first message, the second message encrypted with the second device public key; transmitting a third message to the remote computer system from the second device, the third message comprising response data associated with the required response to the challenge question corresponding to the interaction data, the response data encrypted with the first group public key, the third message encrypted with the remote computer system public key; and in response to receiving an authentication message from the remote computer system indicating that the first device has been authenticated by the remote computer system, permitting interaction between the first device and the remote computer system.

Clause 2: The method of clause 1, wherein the interaction data comprises data associated with at least one interaction, each interaction comprising at least one of a payment transaction or a communication.

Clause 3: The method of clauses 1 or 2, wherein the at least one interaction comprises at least one of an interaction between the second device and the remote computer system, an interaction between the second device and a second remote computer system, an interaction between a third device coupled to the interaction database and the remote computer system, an interaction between the third device and the second remote computer system, or a fictional interaction between a fictional device and a fictional remote computer system.

Clause 4: The method of any of clauses 1-3, further comprising: determining, by the first device, the challenge data and the response data based on the interaction data in the interaction database before transmitting the first message; and in response to receiving the second message, determining, by the second device, the response data based on the challenge data from the second message and the interaction data in the interaction database before transmitting the third message.

Clause 5: The method of any of clauses 1-4, wherein the interaction database, the first device, and the second device are each coupled to a first network.

Clause 6: The method of any of clauses 1-5, wherein the first device, the second device, and the remote computer system are each coupled to a second network separate from the first network, and further wherein the first message is transmitted to the remote computer system from the first device over the second network, the second message is received at the second device from the remote computer system over the second network, and the third message is transmitted to the remote computer system from the second device over the second network.

Clause 7: The method of any of clauses 1-6, wherein the remote computer system authenticates the first device based on a comparison of the response data from the first message and the response data from the third message.

Clause 8: The method of any of clauses 1-7, further comprising storing the challenge data in the interaction database in response to receiving the second message with the challenge data.

Clause 9: The method of any of clauses 1-8, further comprising, in response to receiving an authentication message from the remote computer system indicating that the first device has not been authenticated by the remote computer system, preventing interaction between the first device and the remote computer system.

Clause 10: A method for authenticating a device, comprising: coupling a first device to an interaction database, the interaction database coupled to a second device, the interaction database storing interaction data, the first device storing a first group public key, a first group private key, a first device public key, and a first device private key, the second device storing the first group public key, the first group private key, a second device public key, and a second device private key; transmitting a first message to a first remote computer system from the first device, the first message comprising challenge data associated with a challenge question corresponding to the interaction data, first remote computer system public key data associated with a first remote computer system public key, response data associated with a required response to the challenge question corresponding to the interaction data, and authentication data associated with the first device, the challenge data, the first remote computer system public key data, and the response data each encrypted with the first group public key, the first message encrypted with the first remote computer system public key of the first remote computer system; receiving a second message at the second device from a second remote computer system, the second message comprising the challenge data and the first remote computer system public key data encrypted with the first group public key from the first message, the second message encrypted with the second device public key; transmitting a third message to the second remote computer system from the second device, the third message comprising response data associated with the required response to the challenge question corresponding to the interaction data, the response data encrypted with the first group public key, the third message encrypted with the first remote computer system public key from the second message; and in response to receiving an authentication message from the second remote computer system indicating that the first device has not been authenticated by the second remote computer system, preventing interaction between the first device and at least one of the first remote computer system and the second remote computer system.

Clause 11: A system for authenticating a device, comprising: an interaction database configured to store interaction data; a first device coupled to the interaction database, the first device configured to store a first group public key, a first group private key, a first device public key, and a first device private key; and a second device coupled to the interaction database, the second device configured to store the first group public key, the first group private key, a second device public key, and a second device private key; wherein the first device is configured to transmit a first message to a remote computer system, the first message comprising challenge data associated with a challenge question corresponding to the interaction data, response data associated with a required response to the challenge question corresponding to the interaction data, and authentication data associated with the first device, the challenge data and the response data each encrypted with the first group public key, the first message encrypted with a remote computer system public key of the remote computer system; wherein the second device is configured to receive a second message from the remote computer system, the second message comprising the challenge data encrypted with the first group public key from the first message, the second message encrypted with the second device public key; wherein the second device is configured to transmit a third message to the remote computer system, the third message comprising response data associated with the required response to the challenge question corresponding to the interaction data, the response data encrypted with the first group public key, the third message encrypted with the remote computer system public key; and wherein, in response to receiving an authentication message from the remote computer system indicating that the first device has been authenticated by the remote computer system, the first device is configured to permit interaction between the first device and the remote computer system.

Clause 12: The system of clause 11, wherein the interaction data comprises data associated with at least one interaction, each interaction comprising at least one of a payment transaction or a communication.

Clause 13: The system of clause 11 or 12, wherein the at least one interaction comprises at least one of an interaction between the second device and the remote computer system, an interaction between the second device and a second remote computer system, an interaction between a third device coupled to the interaction database and the remote computer system, an interaction between the third device and the second remote computer system, or a fictional interaction between a fictional device and a fictional remote computer system.

Clause 14: The system of any of clauses 11-13, wherein the first device is configured to determine the challenge data and the response data based on the interaction data in the interaction database before transmitting the first message; and in response to receiving the second message, the second device is configured to determine the response data based on the challenge data from the second message and the interaction data in the interaction database before transmitting the third message.

Clause 15: The system of any of clauses 11-14, wherein the interaction database, the first device, and the second device are each coupled to a first network.

Clause 16: The system of any of clauses 11-15, wherein the first device, the second device, and the remote computer system are each coupled to a second network separate from the first network, and further wherein the first message is transmitted to the remote computer system from the first device over the second network, the second message is received at the second device from the remote computer system over the second network, and the third message is transmitted to the remote computer system from the second device over the second network.

Clause 17: The system of any of clauses 11-16, wherein the remote computer system authenticates the first device based on a comparison of the response data from the first message and the response data from the third message.

Clause 18: The system of any of clauses 11-17, wherein the interaction database is configured to store the challenge data in response to the second device receiving the second message with the challenge data.

Clause 19: The system of any of clauses 11-18, wherein, in response to receiving an authentication message from the remote computer system indicating that the first device has not been authenticated by the remote computer system, the first device is configured to prevent interaction between the first device and the remote computer system.

Clause 20: A system for authenticating a device, comprising an interaction database configured to store interaction data; a first device coupled to the interaction database, the first device configured to store a first group public key, a first group private key, a first device public key, and a first device private key; and a second device coupled to the interaction database, the second device configured to store the first group public key, the first group private key, a second device public key, and a second device private key; wherein the first device is configured to transmit a first message to a remote computer system, the first message comprising challenge data associated with a challenge question corresponding to the interaction data, first remote computer system public key data associated with a first remote computer system public key, response data associated with a required response to the challenge question corresponding to the interaction data, and authentication data associated with the first device, the challenge data, the first remote computer system public key data, and the response data each encrypted with the first group public key, the first message encrypted with the first remote computer system public key of the remote computer system; wherein the second device is configured to receive a second message from a second remote computer system, the second message comprising the challenge data and the first remote computer system public key data encrypted with the first group public key from the first message, the second message encrypted with the second device public key; wherein the second device is configured to transmit a third message to the second remote computer system, the third message comprising response data associated with the required response to the challenge question corresponding to the interaction data, the response data encrypted with the first group public key, the third message encrypted with the first remote computer system public key from the second message; and wherein, in response to receiving an authentication message from the second remote computer system indicating that the first device has not been authenticated by the remote computer system, the first device is configured to prevent interaction between the first device and at least one of the first remote computer system and the second remote computer system.

Clause 21: A computer program product for authenticating a device, the computer program product comprising at least one non-transitory computer-readable medium including one or more instructions that, when executed by at least one processor, cause the at least one processor to couple a first device to an interaction database, the interaction database coupled to a second device, the interaction database storing interaction data, the first device storing a first group public key, a first group private key, a first device public key, and a first device private key, the second device storing the first group public key, the first group private key, a second device public key, and a second device private key; transmit a first message to a remote computer system from the first device, the first message comprising challenge data associated with a challenge question corresponding to the interaction data, response data associated with a required response to the challenge question corresponding to the interaction data, and authentication data associated with the first device, the challenge data and the response data each encrypted with the first group public key, the first message encrypted with a remote computer system public key of the remote computer system, wherein in response to the first message, a second message is received at the second device from the remote computer system, the second message comprising the challenge data encrypted with the first group public key from the first message, the second message encrypted with the second device public key, and in response to the second message, a third message is transmitted to the remote computer system from the second device, the third message comprising response data associated with the required response to the challenge question corresponding to the interaction data, the response data encrypted with the first group public key, the third message encrypted with the remote computer system public key; and in response to receiving an authentication message from the remote computer system indicating that the first device has been authenticated by the remote computer system, permit interaction between the first device and the remote computer system.

Clause 22: The computer program product of clause 21, wherein the interaction data comprises data associated with at least one interaction, each interaction comprising at least one of a payment transaction or a communication.

Clause 23: The computer program product of clause 21 or 22, wherein the at least one interaction comprises at least one of an interaction between the second device and the remote computer system, an interaction between the second device and a second remote computer system, an interaction between a third device coupled to the interaction database and the remote computer system, an interaction between the third device and the second remote computer system, or a fictional interaction between a fictional device and a fictional remote computer system.

Clause 24: The computer program product of any of clauses 21-23, wherein the one or more instructions, when executed by the at least one processor, further cause the at least one processor to determine the challenge data and the response data based on the interaction data in the interaction database before transmitting the first message, wherein, in response to receiving the second message, the second device is configured to determine the response data based on the challenge data from the second message and the interaction data in the interaction database before transmitting the third message.

Clause 25: The computer program product of any of clauses 21-24, wherein the interaction database, the first device, and the second device are each coupled to a first network.

Clause 26: The computer program product of any of clauses 21-25, wherein the first device, the second device, and the remote computer system are each coupled to a second network separate from the first network, and further wherein the first message is transmitted to the remote computer system from the first device over the second network, the second message is received at the second device from the remote computer system over the second network, and the third message is transmitted to the remote computer system from the second device over the second network.

Clause 27: The computer program product of any of clauses 21-26, wherein, in response to receiving the third message, the remote computer system authenticates the first device based on a comparison of the response data from the first message and the response data from the third message.

Clause 28: The computer program product of any of clauses 21-27, wherein the interaction database is configured to store the challenge data in response to the second device receiving the second message with the challenge data.

Clause 29: The computer program product of any of clauses 21-28, wherein, in response to receiving an authentication message from the remote computer system indicating that the first device has not been authenticated by the remote computer system, the first device is configured to prevent interaction between the first device and the remote computer system.

Clause 30: A computer program product for authenticating a device, the computer program product comprising at least one non-transitory computer-readable medium including one or more instructions that, when executed by at least one processor, cause the at least one processor to couple a first device to an interaction database, the interaction database coupled to a second device, the interaction database storing interaction data, the first device storing a first group public key, a first group private key, a first device public key, and a first device private key, the second device storing the first group public key, the first group private key, a second device public key, and a second device private key; transmit a first message to a first remote computer system from the first device, the first message comprising challenge data associated with a challenge question corresponding to the interaction data, first remote computer system public key data associated with a first remote computer system public key, response data associated with a required response to the challenge question corresponding to the interaction data, and authentication data associated with the first device, the challenge data, the first remote computer system public key data, and the response data each encrypted with the first group public key, the first message encrypted with the first remote computer system public key of the first remote computer system, wherein in response to the first message, a second message is received at the second device from a second remote computer system, the second message comprising the challenge data and the first remote computer system public key data encrypted with the first group public key from the first message, the second message encrypted with the second device public key, and in response to the second message, a third message is transmitted to the second remote computer system from the second device, the third message comprising response data associated with the required response to the challenge question corresponding to the interaction data, the response data encrypted with the first group public key, the third message encrypted with the first remote computer system public key from the second message; and in response to receiving an authentication message from the second remote computer system indicating that the first device has not been authenticated by the second remote computer system, prevent interaction between the first device and at least one of the first remote computer system and the second remote computer system.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments or aspects that are illustrated in the accompanying figures, in which.

DETAILED DESCRIPTION

Figure 1:
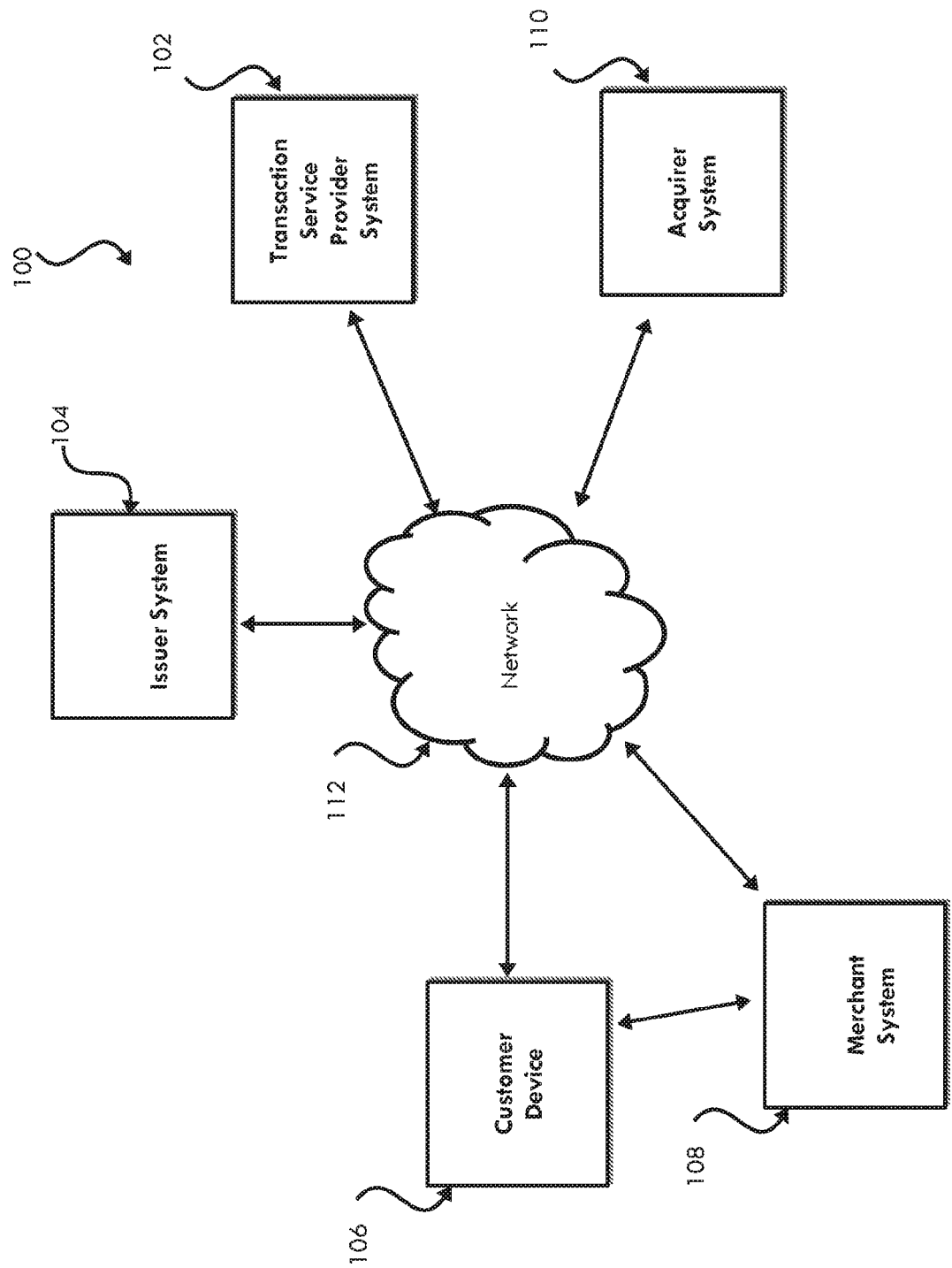
FIG. 1 is a diagram of some non-limiting embodiments or aspects of an environment in which methods, systems, and/or computer program products, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a primary account number, a card number, a payment card number, a token, and/or the like). In some non-limiting embodiments or aspects, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the term "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein "merchant system" may refer to one or more computer systems operated by or on behalf of a merchant, such as a server computer executing one or more software applications. As used herein, the term "product" may refer to one or more goods and/or services offered by a merchant.

As used herein, a "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used herein, the term "Internet of Things (IoT) device" may refer to one or more devices (e.g., client devices, appliances, smart devices, computers, portable computers, laptop computers, tablet computers, mobile devices, cellular phones, wearable devices, PDAs, objects, and/or the like) capable of communication with other such devices and/or other computing devices over a network (e.g., a public network, the Internet, a private network, and/or the like). As an example, an IoT device may refer to one or more devices or objects capable of being identified within and integrated into one or more communication networks.

Non-limiting embodiments or aspects of the disclosed subject matter are directed systems, methods, and computer program products for authentication, including, but not limited to, authenticating a device. For example, non-limiting embodiments or aspects of the disclosed subject matter provide authenticating a device with a remote computer system by using a protocol involving an interaction database and at least one other device. Such embodiments or aspects provide techniques and systems for automatic authentication with the remote computer system without human effort and/or intervention (or at least reduced human effort and/or intervention). Additionally or alternatively, such techniques and systems may include using challenge data (e.g., a challenge question) and corresponding response data (e.g., a required response to the challenge question) that may be dynamic (e.g., determined dynamically based on information in the interaction database), which improves security by preventing an attacker (e.g., an eavesdropper) from reusing the challenge-response combination for future authentication and by ensuring the challenge is only solvable by a device connected to the interaction database (e.g., a device in a trusted group). Additionally or alternatively, such techniques and systems may include communicating messages with multiple levels and/or formats of encryption (e.g., at least one portion of the message encrypted with one public key and then the whole message encrypted with another public key) to that the receiver can only partially decrypt the message while the at least one portion that was encrypted remains encrypted, which improves security by preventing an attacker (e.g., a man-in-the-middle) from exploiting the protocol and improves flexibility by allowing partial encryption/decryption with the public key of a third party while maintaining security of the at least one portion that was encrypted. Additionally or alternatively, such techniques and systems may include using a public key and a private key pair for each device as well as a public key and a private key for a group of devices, which improves security and flexibility because the remote computer system can select any device in the group to authenticate a new device and obviates the need for the new device to select which device authenticates it (e.g., preventing the new device from selecting a compromised device). Additionally or alternatively, the interaction database may be protected from unauthorized access by physical isolation and/or encrypted communications with the device(s) coupled thereto (e.g., devices of the trusted group), which further improves security.

For the purpose of illustration, in the following description, while the presently disclosed subject matter is described with respect to methods, systems, and computer program products for authenticating a device, e.g., to make payment transactions, one skilled in the art will recognize that the disclosed subject matter is not limited to the illustrative embodiments or aspects. For example, the methods, systems, and computer program products described herein may be used with a wide variety of settings, such as authenticating a device related to other types of interactions, e.g., communications, non-payment transactions, interactions involving any device(s), system(s), network(s), and/or combinations thereof, or any other suitable setting for authentication.

Referring now to FIG. 1, FIG. 1 is a diagram of some non-limiting embodiments or aspects of an environment 100 in which systems, apparatus, and/or methods, as described herein, may be implemented. As shown in FIG. 1, environment 100 includes transaction service provider system 102, issuer system 104, customer device 106, merchant system 108, acquirer system 110, and network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to transaction service provider system 102. In some non-limiting embodiments or aspects, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, acquirer system 110 via network 112. Additionally or alternatively, each customer device 106 may include a device capable of receiving information from and/or communicating information to other customer devices 106 via network 112, another network (e.g., an ad-hoc network, a local network, a private network, a virtual private network, and/or the like), and/or any other suitable communication technique. For example, customer device 106 may include a client device, an IoT device, and/or the like. In some non-limiting embodiments or aspects, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee communication connection, and/or the like) with customer device 106, and/or the like, and/or communicating information to customer device 106 via the network, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments or aspects, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
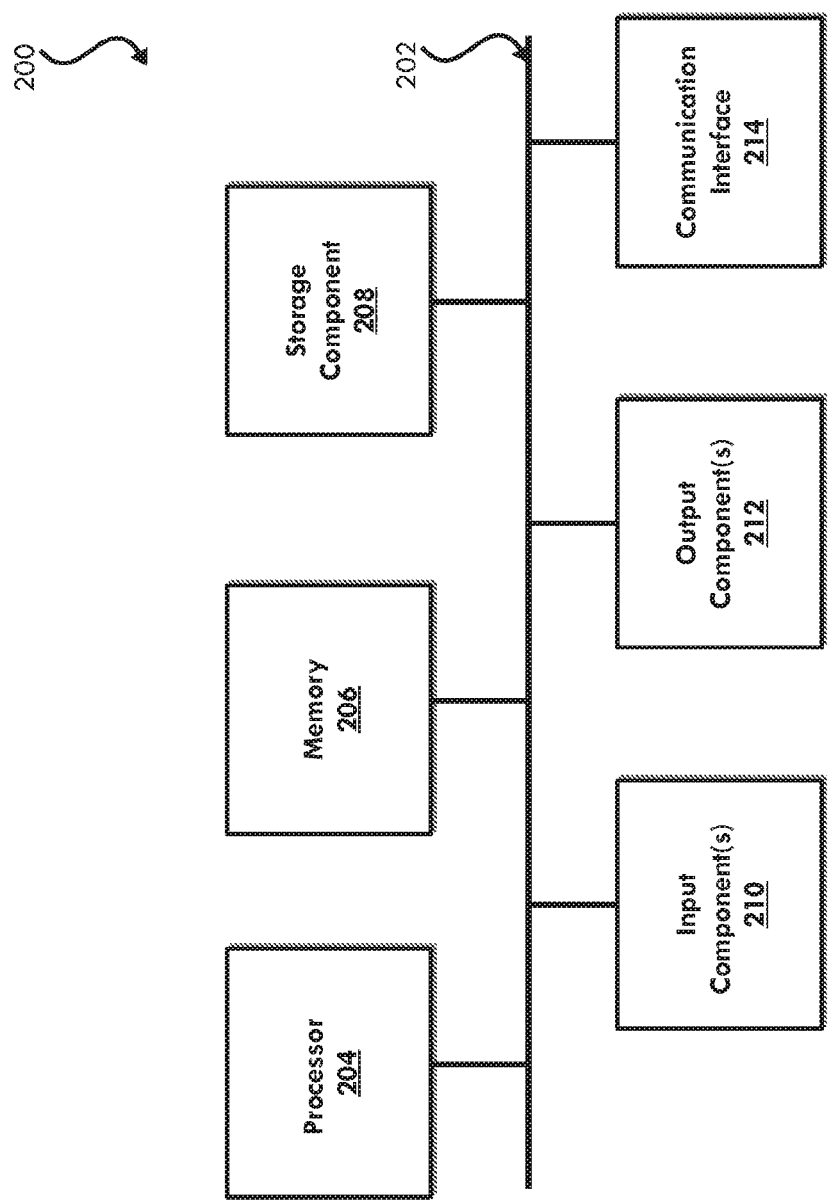
FIG. 2 is a diagram of some non-limiting embodiments or aspects of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments or aspects, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, and/or the like). Additionally, or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
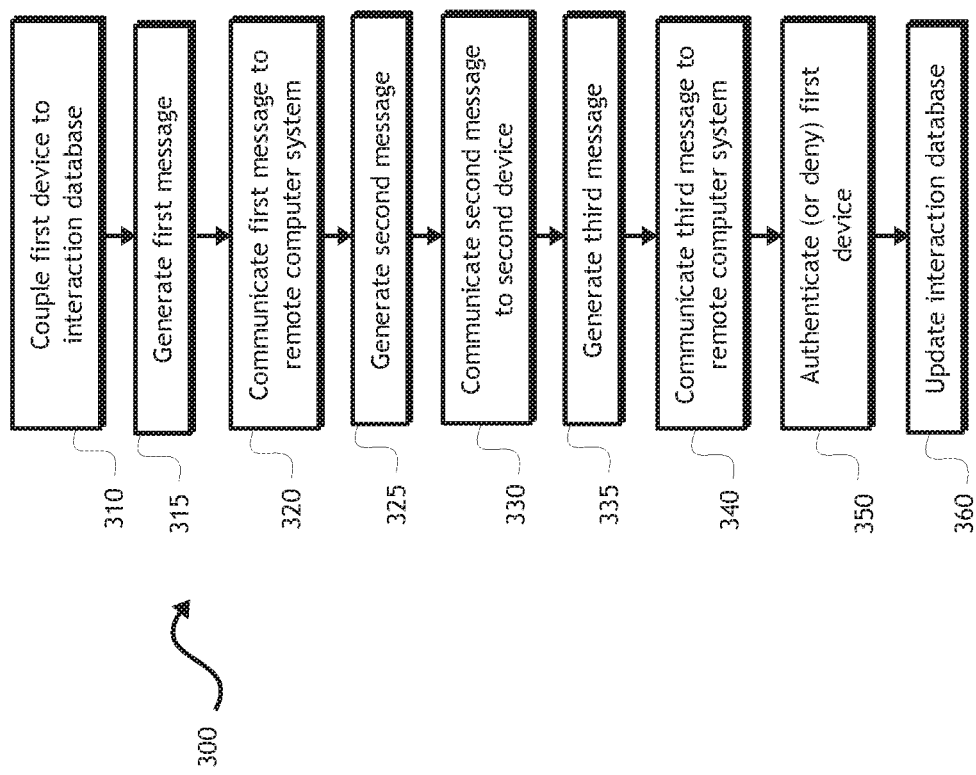
FIG. 3 is a flowchart of some non-limiting embodiments or aspects of a process for authenticating a device according to the principles of the present disclosure.

Referring now to FIG. 3, FIG. 3 is a flowchart of some non-limiting embodiments or aspects of a process 300 for authenticating a device (e.g., a first device). In some non-limiting embodiments or aspects, one or more of the steps of process 300 may be performed (e.g., completely, partially, and/or the like) by customer device(s) 106. In some non-limiting embodiments or aspects, one or more of the steps of process 300 may be performed (e.g., completely, partially, and/or the like) by another system, another device, another group of systems, or another group of devices, separate from or including customer device(s) 106, such as transaction service provider system 102 (e.g., one or more devices of transaction service provider system 102), issuer system 104 (e.g., one or more devices of issuer system 104), merchant system 108 (e.g., one or more devices of merchant system 108), or acquirer system 110 (e.g., one or more devices of acquirer system 110). In some non-limiting embodiments or aspects, with reference to FIG. 3, a first device to be authenticated and one or more other devices that have previously been authenticated (e.g., a second device, a third device, a fourth device, etc.) each may be the same as or similar to customer device 106 or another computing device (e.g., an IoT device and/or the like). Additionally or alternatively, the first device and the other previously authenticated devices each may be implemented (e.g., completely, partially, and/or the like) by another system, such as transaction service provider system 102, issuer system 104, or merchant system 108. In some non-limiting embodiments, an interaction database (to which the first device and the other previously authenticated devices may be connected) also may be the same as or similar to customer devices 106 or another computing device (e.g., an IoT device and/or the like). Additionally or alternatively, the interaction database may be implemented (e.g., completely, partially, and/or the like) by another system, such as transaction service provider system 102, issuer system 104, or merchant system 108. In some non-limiting embodiments or aspects, with reference to FIG. 3, a remote computer system (e.g., with which the first device is to be authenticated) may be the same as or similar to merchant system 108, one or more devices thereof, and/or another computing device (e.g., a server and/or the like). Additionally or alternatively, the remote computer system may be implemented (e.g., completely, partially, and/or the like) by another system, such as transaction service provider system 102, issuer system 104, or acquirer system 110. In some non-limiting embodiments or aspects, with reference to FIG. 3, the first device and the other previously authenticated device(s) may be connected and/or coupled to the interaction database by one or more first networks, which may be the same as or similar to network 112 and/or another communication connection/interface (e.g., an ad-hoc network, a local network, a private network, a virtual private network, a short-range wireless network, and/or the like), as described herein. Additionally or alternatively, the first device and the other previously authenticated device(s) may be connected to the remote computer system one or more second networks, which may be the same as or similar to network 112 and/or another communication connection/interface (e.g., a public network, the Internet, and/or the like). In some non-limiting embodiments or aspects, and the second network(s) may be separate from the first network(s).

As shown in FIG. 3, at step 310, process 300 may include coupling a first device to an interaction database. In some non-limiting embodiments or aspects, the first device may couple to the interaction database by joining a first network to which the interaction database has been previously connected. Additionally or alternatively, one or more previously authenticated devices (e.g., a second device, a third device, a fourth device, etc.) and/or one or more other devices (e.g., other customer devices 106, other IoT devices, and/or the like) may be coupled to the interaction database. For example, such previously authenticated device(s) and/or such other device(s) may have been previously coupled to the interaction database. In some non-limiting embodiments or aspects, the all devices connected to the interaction database may form a trusted group, as described herein. For the purpose of illustration, such devices connected to the interaction database and/or forming the trusted group may include an IoT devices and/or the like, which may be connected to the interaction database by a network (e.g., the same as or similar to network 112) and/or other communication connection/interface, as described herein. In some non-limiting embodiments or aspects, the interaction database may be part of at least one hub to which the devices connect. Additionally or alternatively, the interaction database may be implemented (e.g., completely, partially, and/or the like) separate from and connected to such a hub. In some non-limiting embodiments or aspects, at least one previously connected device (e.g., devices previously coupled to the interaction database) and/or a hub to which devices are connected may automatically couple a new device (e.g., the first device) to the interaction database, e.g., based on detected proximity of the new device to the previously-coupled device and/or hub, based on detecting signals/messages for pairing of the new device, and/or the like. Additionally or alternatively, a customer/user may couple each device or some of the devices to the interaction database (e.g., by manually authenticating the device with the interaction database, with another device previously coupled to the interaction database, with a hub, and/or with a network to which the interaction database has been connected). In some non-limiting embodiments or aspects, all (or at least some) devices in the trusted group may share (e.g., each store) a group public key (e.g., a first group public key) and a corresponding group private key (e.g., a first group private key) associated with the group public key. The group public key and group private key may be any suitable keys for any suitable encryption technique, including, but not limited to, asymmetric cryptography, Rivest-Shamir-Adleman (RSA) encryption, and/or the like. Additionally or alternatively, each device may have (e.g., store) its own device public key and corresponding device private key associated therewith. For example, the first device may store a first device public key and a first device private key (e.g., in addition to the first group public key and first group private key), and the second device may store a second device public key and a second device private key (e.g., in addition to the first group public key and first group private key).

In some non-limiting embodiments or aspects, the interaction data may include data associated with at least one interaction. For example, each interaction may be a payment transaction, a communication, and/or the like. In some non-limiting embodiments or aspects, the interaction database may store any interaction that occurs between a device in the group and a third party (e.g., a remote computer system). Additionally or alternatively, the interaction database may store interactions between a device in the trusted group and another device in the trusted group. For the purpose of illustration, Table 1 shows a listing of hypothetical entries in an exemplary interaction database:

TABLE 1

| ID  | Timestamp              | Data | Order |
|-----|------------------------|------|-------|
| 122 | 01:01:2018:02:05:33:055 | ...  | 3     |
| 154 | 01:01:2018:03:08:24:967 | ...  | 2     |
| 173 | 01:01:2018:05:01:35:112 | ...  | 1     |

As shown in Table 1, for the purpose of illustration, each entry may include a Timestamp, which may include the time and/or date of the respective transaction, as well as Data, which may include identifiers of the sending/initiating device/system and/or the receiving/responding device/system, the content of the interaction (e.g., information exchanged, such as data, signals, messages, instructions, commands, and/or the like) or a portion thereof, and/or the like. Additionally or alternatively, each entry may also include an ID, which may include a unique identifier for the entry. For example, the identifier may be any suitable value (e.g., number or text) that uniquely identifies a transaction with respect to other transactions, including, but not limited to, a count that increments by one for each entry in the interaction database, an identifier determined based on the Timestamp, a concatenation and/or hash of the Timestamp and at least a portion of interaction data, and/or the like. Additionally or alternatively, the interaction database may determine an Order for each transaction, which may be an integer, an ordinal number, and/or the like representing the order in which interactions were stored in the interaction database (e.g., 1 corresponding to first most recent, 2 corresponding to second most recent, etc.).

In some non-limiting embodiments or aspects, the interaction database may include at least one of an interaction between a remote computer system and a device previously connected to the interaction database and/or previously authenticated with the remote computer system. Additionally or alternatively, the interaction database may store an interaction between such a device and a second remote computer system. Additionally or alternatively, the interaction database may store a fictional interaction between a fictional device and a fictional remote computer system. For example, such a fictional interaction may be used when there are no other entries in the interaction database and/or when the interaction database includes only entries that cannot be used for future authentications (e.g., if entries therein were used for past authentications and if repeating such entries is prohibited, as described herein).

In some non-limiting embodiments or aspects, the interaction database may be not directly exposed to public networks (e.g., the Internet). For example, the interaction database may be protected from unauthorized access by physical isolation and/or encrypted communications with the device(s) coupled thereto (e.g., devices of the trusted group). For the purpose of illustration, the device(s) coupled to the interaction database (e.g., in the trusted group) may be connected to a first network (e.g., an ad-hoc network, a local network, a private network, a virtual private network, a short-range wireless network, and/or the like), as described herein. Additionally or alternatively, the device(s) (but not the interaction database) may be separately connected to a second network (e.g., a public network, the Internet, and/or the like), which may be connected to a remote computer system, as described herein.

As shown in FIG. 3, at step 315, process 300 may include generating a first message. For example, the first device may access the interaction database and/or request from the interaction database challenge data associated with a challenge question corresponding to the interaction data and response data associated with a required response to the challenge question corresponding to the interaction data. Additionally or alternatively, the first device may generate at least a portion of the challenge question and access the interaction database and/or request from the interaction database response data associated with a required response to the challenge question corresponding to the interaction data (as well as any additional information necessary to complete the challenge question, if any). The first device may also have stored thereon authentication data. For example, authentication data may include the first device public key, the group public key, and/or the like. Additionally or alternatively, authentication data may include any data and/or information that may be used to uniquely identify the first device and/or the trusted group. For example, such data and/or information may include a static IP address (e.g., of the first device, of another device in the trusted group, or of the trusted group), a hardware device identifier such as a media access control (MAC) address (e.g., of the first device, of another device in the trusted group, or of the trusted group), a custom device identifier provided by the remote computer system (e.g., as part of an initial device registration protocol with the remote computer system), a custom device identifier provided by another third party computer system, a custom device identifier provided by the remote computer system or another third party computer system, and/or the like.

In some non-limiting embodiments or aspects, the remote computer system may have a public key (e.g., first remote computer system public key) and a corresponding private key (e.g., first remote computer system private key) associated therewith. For example, the remote computer system may store the first remote computer system public key and remote computer system private key. In some non-limiting embodiments, the first device may obtain the remote computer system public key by any suitable technique, including obtaining the first remote computer system public key from a trusted third party (e.g., a third party computer system), from a centralized certification authority, from a public directory, from the remote computer system (e.g., as part of an initial device registration protocol with the remote computer system), and/or the like.

In some non-limiting embodiments or aspects, the challenge data, the response data, and the authentication data may be included in the first message. Additionally or alternatively, the challenge data and the response data each may be encrypted with the first group public key, and the entire first message (e.g., including the authentication data and the encrypted challenge and response data) may be encrypted with a remote computer system public key of the remote computer system. For the purpose of illustration, if the challenge and response data are encrypted with the first group public key, a third party (e.g., the remote computer system and/or an attacker such as a man-in-the-middle) may be unable to see such data in raw (e.g., unencrypted) form, and if the whole message is encrypted with the remote computer system's public key, a third party (e.g., an attacker, such as an eavesdropper) may be unable to see the message in raw (e.g., unencrypted) form. For example, the first message may be represented as follows:

$$RC1pub(Gpub(qtn)+Gpub(Ans)+authData),$$

where RC1pub is the remote computer system public key, Gpub is the first group public key, qtn is the challenge data, Ans is the response data, and authData is the authentication data.

In some non-limiting embodiments or aspects, the first message may further include first remote computer system public key data associated with a first remote computer system public key. For example, the challenge data, the first remote computer system public key data, and the response data each may be encrypted with the first group public key, and the entire first message may be encrypted with the first remote computer system public key of the first remote computer system. In some non-limiting embodiments or aspects, the first remote computer system public key data may be combined with the challenge question data before encryption. For example, the first remote computer system public key data and the challenge question data may be two separate fields within a single encrypted block encrypted by the first public key or may be combined by any suitable technique, e.g., concatenation, hashing, and/or the like. In some non-limiting embodiment, the encrypted form of the combined challenge data and first remote computer system public key data may be represented as follows:

$$Gpub(qtn+RC1pub),$$

and the first message may thus be represented as follows:

$$RC1pub(Gpub(qtn+RC1pub)+Gpub(Ans)+authData).$$

In some non-limiting embodiments or aspects, the first device may determine the challenge data and the response data based on the interaction data in the interaction database, as described herein. For example, a hypothetical challenge question may be stated in prose as: "What is the ordinal status of the interaction database record with ID 173 at this time?" where 173 is a number corresponding to an ID in the hypothetical interaction database of Table 1. Stated in pseudocode, such a challenge question may be represented as follows:

$$qtn=IntID,current\_timestamp,$$

where IntID is a variable with a value 173 (corresponding to the ID number 173 in the hypothetical interaction database of Table 1) and current_timestamp is the time at which the challenge is made. Based on the information in the hypothetical interaction database of Table 1, the required response to such a challenge would be the Order value of the entry, which in this example would be 1. Stated in pseudocode, the answer to such a challenge may be represented as follows:

$$Ans=1.$$

Additionally, since new entries may be written to/stored in the interaction database over time (e.g., each time a new interaction occurs), additional entries may be written to the interaction database after the challenge question is formed. By including the time (e.g., current_timestamp), the interaction database may disregard certain entries therein (e.g., entries created after the current time when the challenge question was generated) so that the response to the challenge question is based on the entries in the interaction database from at or before the time the challenge was formed. As such, the challenge question and required response may be dynamic, as challenges formed at different times (e.g., different values of current_timestamp) may result in different responses (e.g., values of Ans).

As shown in FIG. 3, at step 320, process 300 may include communicating the first message to the remote computer system. For example, a first message may be transmitted to the remote computer system from the first device. For the purpose of illustration, the first message may include the challenge data, the first remote computer system public key data, the response data, and/or the authentication data for the first device, as described herein. Additionally or alternatively, the challenge data, the first remote computer system public key data, and/or the response data each may be encrypted with the first group public key, as described herein, and the entire first message may be encrypted with the first remote computer system public key of the first remote computer system, as described herein.

In some non-limiting embodiments or aspects, the first device, other devices of the trusted group (e.g., the second device), and the remote computer system each may be coupled to a second network separate from the first network, as described herein. Additionally or alternatively, the first message may be transmitted to the remote computer system from the first device over the second network.

As shown in FIG. 3, at step 325, process 300 may include generating a second message (e.g., in response to receiving the first message). For example, the remote computer system may decrypt the first message using a remote computer system private key. As such, the remote computer system may access the authentication data of the first device (unencrypted) as well as the encrypted challenge data (and the first remote computer system public key data if included in the first message and/or combined and/or encrypted with the challenge data) and the encrypted response data. Additionally or alternatively, the remote computer system may select another device from the trusted group (e.g., the second device) separate from the first device. In some non-limiting embodiments, the remote computer system may determine the trusted group to which the first device belongs (and/or the other devices therein) using any suitable technique. For example, the remote computer system may determine the trusted group to which the device belongs (and/or the other devices therein) based on data and/or information provided in the authentication data, based on an initial device registration protocol with the remote computer system, and/or the like. In some non-limiting embodiments or aspects, the remote computer system may select the second device from among all devices of the trusted group (excluding the first device). In some non-limiting embodiments, the remote computer system may select the second device from the trusted group by any suitable technique, including selecting at random, selecting based on a pseudorandom number, and/or the like. In some non-limiting embodiments, the remote computer system may determine the public key from another device in the group (e.g., the second device public key for the second device) using any suitable technique, including a trusted third party (e.g., a third party computer system), from a centralized certification authority, from a public directory, based on a previous device registration protocol with the other device (e.g., the second device), based on a previous interaction (e.g., a payment transaction) with the other device (e.g., the second device), and/or the like. For the purpose of illustration, if the remote computer system selects which device of the trusted group to use to authenticate the first device (e.g., compared to the first device requesting/selecting another device), security may be improved because a first device cannot intentionally select a compromised device (e.g., of an attacker) for such authentication.

In some non-limiting embodiments or aspects, the second message may include the challenge data encrypted with the first group public key from the first message. Additionally or alternatively, the entire second message may be encrypted with the second device public key of the second device of the trusted group. Accordingly, the second message may be represented as follows:

Bpub(Gpub(*qtn*)), where Bpub is the second device public key. In some non-limiting embodiments or aspects, the second message may also include the first remote computer system public key data encrypted with the first group public key from the first message. For example, the first remote computer system public key data may be combined and/or encrypted with the challenge data, as described herein. Additionally or alternatively, the entire second message may be encrypted with the second device public key. For purpose of illustration, the second message may thus be represented as follows:

Bpub(Gpub(*qtn*+RC1pub)).

As shown in FIG. 3, at step 330, process 300 may include communicating the second message to the second device. For example, the second device may receive the second message from the remote computer system. In some non-limiting embodiments or aspects, the first device, other devices of the trusted group (e.g., the second device), and the remote computer system each may be coupled to a second network separate from the first network, as described herein. Additionally or alternatively, the second message may be received at the second device from the remote computer system over the second network. For the purpose of illustration, the second message may include the challenge data and/or the first remote computer system public key data, as described herein. For example, the challenge data and/or the first remote computer system public key data may be combined and/or encrypted (separately or together), as received at the remote computer system in the first message. Additionally or alternatively, the entire second message may be encrypted using the second device public key, as described herein.

As shown in FIG. 3, at step 335, process 300 may include generating a third message (e.g., in response to receiving the second message). For example, the second device may decrypt the second message using the second device private key, and/or the second device may decrypt the challenge data (and the first remote computer system public key data if included in the second message and/or combined and/or encrypted with the challenge data). Additionally or alternatively, the second device may determine the response data based on the challenge data from the second message and the interaction data in the interaction database. For example, the second device may access the interaction database and/or request from the interaction database response data associated with the required response to the challenge question corresponding to the interaction data.

In some non-limiting embodiments or aspects, the third message may include the response data as determined by the second device (e.g., in response to receiving the second message). For example, the response data may be encrypted with the first group public key, as described herein. Additionally or alternatively, the third message may be encrypted with the remote computer system public key. For the purpose of illustration, the third message may be represented as follows:

RC1pub(Gpub(*ans*)), as described herein.

In some non-limiting embodiments or aspects, the second message may include the first remote computer system public key data. If so, the third message may be encrypted using the first remote computer system public key as determined from the first computer system public key data, regardless of whether the second device has stored or otherwise determined a different public key (e.g., a second remote computer system public key) to be the true public key of the remote computer system. For the purpose of illustration, even if the first device was compromised by a man-in-the-middle attacker such that the first device transmitted the first message using the wrong key (e.g., the first remote computer system public key), which may be intercepted by the attacker and decrypted using the first remote computer system public key, the attacker may only be able to completely decrypt a portion of the first message while the other portions remain encrypted by the group public key, as described herein. Further, even if such an attacker then re-encrypted the first message using the true public key of the remote computer system (e.g., the second remote computer system public key), the second device may still encrypt the third message with the first remote computer system public key (from the portion of the second message including the combined challenge data and first remote computer system public key data encrypted with the group public key), which the true remote computer system would be unable to decrypt, thereby preventing authentication of the (compromised) first device and improving security.

In some non-limiting embodiments or aspects, the second device may check the interaction database to determine whether any of the devices in the trusted group has used (e.g., generated or received) the challenge question from the second message previously. For example, if the challenge question has been used previously, the second device may determine that the challenge question is no longer valid. For the purpose of illustration, the third message may include a message that the challenge question is invalid. For example, such a message may include a text string, a numeric value, and/or the like reserved for invalid challenge questions. As such, security may be improved because reuse of a previous challenge-response may be prevented (e.g., a replay attack by an eavesdropper or fake third party that attempts to simply repeat a previous challenge-response).

Additionally or alternatively, the second device may determine that the challenge question is invalid because too much time has lapsed since the challenge question was generated. For example, as described herein, challenge data may include a timestamp of when the challenge was generated. The interaction database and/or at least one device of the trusted group (e.g., the second device) may include (e.g., store) a time expiration threshold, which may indicate a maximum time for which a challenge question is valid after generation. The expiration threshold may be any suitable time period, including, but not limited to, 15 minutes, 1 hour, 1 day, and/or the like. If the difference between a timestamp of the challenge data and the current time at which the second device is checking the challenge data against the interaction database is greater than the time expiration threshold, the second device may determine that the challenge question is invalid. In some non-limiting embodiments or aspects, the third message may include a message that the challenge question is invalid.

As shown in FIG. 3, at step 340, process 300 may include communicating the third message to the remote computer system. For example, the third message may be transmitted to the remote computer system from the second device. In some non-limiting embodiments or aspects, the first device, other devices of the trusted group (e.g., the second device), and the remote computer system each may be coupled to a second network separate from the first network, as described herein. Additionally or alternatively, the third message may be transmitted to the remote computer system from the second device over the second network. For the purpose of illustration, the third message may include the response data, as described herein (or the message indicating that the challenge data is invalid, as described herein). For example, the response data (or the message indicating that the challenge data is invalid) may be encrypted with the first group public key, as described herein. Additionally or alternatively, the entire third message may be encrypted with the first remote computer system public key, as described herein. For example, the first remote computer system public key may be extracted from the decrypted first remote computer system public key data from the second message.

As shown in FIG. 3, at step 350, process 300 may include making a determination based on the third message. For example, the remote computer system may authenticate or deny the first device based on the third message. For the purpose of illustration, the remote computer system may decrypt the third message using the remote computer system public key. Additionally or alternatively, the remote computer system may compare the response data from the third message (e.g., as encrypted with the first group public key in the third message) to the response data from the first message (e.g., as encrypted with the first group public key in the first message). In some non-limiting embodiments or aspects, the remote computer system may authenticate the first device based on the comparison. For example, if the response data from the third message matches the response data from the first message, the remote computer system may authenticate the first device. For example, if the first device is authenticated (e.g., truly a member of the trusted group), the first device may be permitted to interact with the remote computer system (e.g., perform payment transactions with the remote computer system).

Additionally or alternatively, the remote computer system may communicate an authentication message. For example, the authentication message may indicate that the first device has been authenticated or that the first device has not been authenticated (e.g., authentication failed). For the purpose of illustration, the remote computer system may transmit the authentication message to the first device and/or to another device of the trusted group (e.g., the second device). In some non-limiting embodiments, the message may be an acknowledgment message (e.g., to indicate successful authentication) or a negative acknowledgment message (e.g., to indicate authentication failure). In some non-limiting embodiments, in response to receiving the authentication message from the remote computer system (e.g., indicating that the first device has been authenticated by the remote computer system), the first device may be permitted to interact with the remote computer system. For example, the first device may place orders (e.g., for goods, for refills, for services, and/or the like) and/or perform payment transactions with the remote computer system. Additionally or alternatively, the first device may perform other types of interactions (e.g., communications, non-payment transactions, and/or interactions involving any other device(s), system(s), network(s), and/or combinations thereof). For the purpose of illustration, such payment transactions may be performed using an account identifier previously stored with the remote computer based on an interaction with another device in the public group and/or previously stored with the remote computer system based on input from the customer.

In some non-limiting embodiments or aspects, the remote computer system may deny (e.g., reject authentication of) the first device. For example, if the remote computer system cannot decrypt the third message, if the response data from the third message does not match the response data from the first message, and/or if the response data in the third message indicates that the challenge question is invalid, the remote computer system may deny the first device. Additionally or alternatively, the remote computer system may communicate an authentication message indicating that the first device has not been authenticated by the remote computer system. For example, in response to receiving the authentication message from the remote computer system indicating the first device has not been authenticated, the first device may be prevented from interacting with the remote computer system.

For the purpose of illustration, even if the first device was compromised by a man-in-the-middle attacker such that the first device transmitted the first message using the wrong key (e.g., the first remote computer system public key), which may be intercepted by the attacker and decrypted using the first remote computer system public key, the attacker may only be able to completely decrypt a portion of the first message while the other portions remain encrypted by the group public key, as described herein. Further, even if such an attacker then re-encrypted the first message using the true public key of the remote computer system (e.g., the second remote computer system public key), the second device may still encrypt the third message with the first remote computer system public key (from the portion of the second message including the combined challenge data and the first remote computer system public key data encrypted with the group public key), which the true remote computer system would be unable to decrypt, thereby preventing authentication of the (compromised) first device and improving security. Additionally or alternatively, the remote computer system may communicate an authentication message indicating that the first device has not been authenticated by the remote computer system, and the first device may be prevented from interaction with the remote computer system and/or may be prevented from interacting with the attacker.

As shown in FIG. 3, at step 360, process 300 may include updating the interaction database. For example, in response to receiving the second message, the challenge data from the second message may be stored in the interaction database. For the purpose of illustration, as described herein, the second device may decrypt the second message using the second device private key (and the group private key). The second device may also check the transaction database to confirm that the challenge data has not been used previously, as described herein. If the challenge data has not been used previously, the second device may write the challenge data to the interaction database and/or request that the interaction database store the challenge data (e.g., by communicating with the interaction database over the first network, as described herein). Thereafter, if any device of the trusted group receives the same challenge data in future, such device may check the interaction database and confirm that such challenge data has previously been used. Accordingly, such device(s) may determine that the challenge data is invalid for future authentications.

Figure 4:
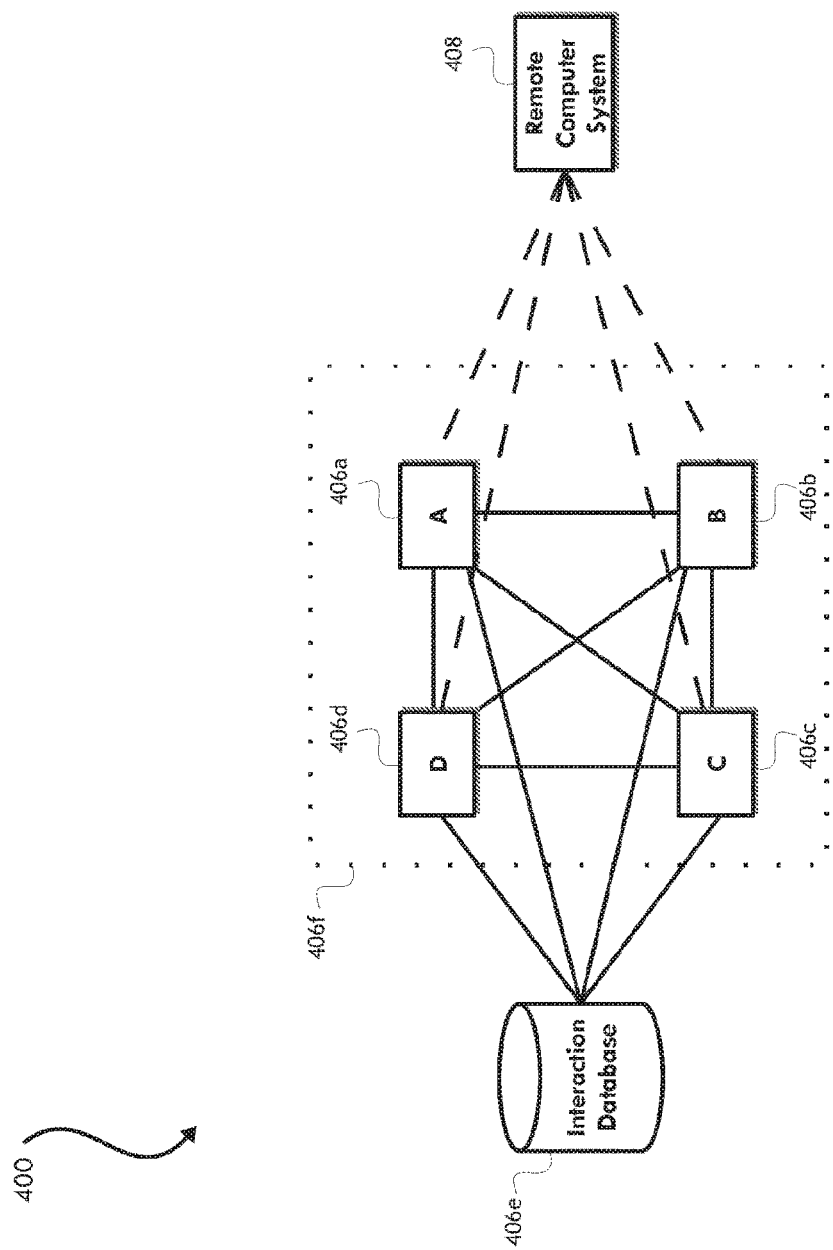
FIG. 4 is a diagram of an implementation of some non-limiting embodiments or aspects of the process shown in FIG. 3.

Referring now to FIG. 4, FIG. 4 is a diagram of an overview of some non-limiting embodiments or aspects of an implementation 400 relating to process 300 shown in FIG. 3. As shown in FIG. 4, implementation 400 includes first device 406a, second device 406b, third device 406c, fourth device 406d, and interaction database 406e. For the purpose of illustration, each of first device 406a, second device 406b, third device 406c, fourth device 406d, and interaction database 406e may be the same as or similar to customer device 106. Additionally or alternatively, at least one of these components (e.g., interaction database 406e) may be implemented (e.g., completely, partially, and/or the like) by another system, including, but not limited to, transaction service provider system 102, issuer system 104, and/or merchant system 108. For example, first device 406a, second device 406b, third device 406c, and fourth device 406d may be interconnected over a first network, as described herein. Additionally or alternatively, each of first device 406a, second device 406b, third device 406c, and fourth device 406d may be connected to interaction database 406e over the first network, as described herein. For the purpose of illustration, the first network may be an ad-hoc network, a local network, a private network, a virtual private network, a short-range wireless network, and/or a combination thereof, as described herein. In some non-limiting embodiments or aspects, at least one of these components (e.g., interaction database 406e or second device 406b) may be a hub to which the other components connect, as described herein. Additionally or alternatively, at least one of first device 406a, second device 406b, third device 406c, and/or fourth device 406d may be an IoT device, an appliance, a smart device, a client device, and/or the like, as described herein.

In some non-limiting embodiments or aspects, first device 406a, second device 406b, third device 406c, and fourth device 406d may form trusted group 406f. Each device of the trusted group may share (e.g., store) a group public key (e.g., first group public key) and a group private key (e.g., first group private key), as described herein. Additionally, each device may include (e.g., store) its own public key and private key. For example, first device 406a may store a first device public key and a first device private key (e.g., in addition to the first group public key and first group private key); second device 406b may store a second device public key and a second device private key (e.g., in addition to the first group public key and first group private key); third device 406c may store a third device public key and a third device private key (e.g., in addition to the first group public key and first group private key); and fourth device 406d may store a fourth device public key and a fourth device private key (e.g., in addition to the first group public key and first group private key), as described herein.

In some non-limiting embodiments or aspects, first device 406a, second device 406b, third device 406c, and fourth device 406d may be connected to remote computer system 408. For the purpose of illustration, remote computer system 408 may be the same as or similar to merchant system 108. Additionally or alternatively, remote computer system 408 may be implemented (e.g., completely, partially, and/or the like) by another system, including, but not limited to, transaction service provider system 102, issuer system 104, and/or acquirer system 110. In some non-limiting embodiments or aspects, remote computer system 408 may be connected to at least some devices in trusted group 406f (e.g., at least some of first device 406a, second device 406b, third device 406c, and fourth device 406d) over a second network (e.g., a public network, the Internet, and/or the like), as described herein.

For the purpose of illustration, to authenticate first device 406a with remote computer system 408, first device 406a may generate (based on interaction data in interaction database 406e) and/or communicate a first message to remote computer system 408, as described herein. Remote computer system 408 may select another device in trusted group 406f (e.g., one of second device 406b, third device 406c, or fourth device 406d) and/or generate and/or communicate a second message to such device, as described herein. The device that receives the second message may generate (based on interaction data in interaction database 406e) and/or communicate a third message to remote computer system 408, as described herein. Based on the third message, first device 406a may be authenticated (or not) for interaction with remote computer system 408, as described herein. Additionally, the interaction database 406e may be updated (e.g., based on the second message), as described herein.

Figure 5:
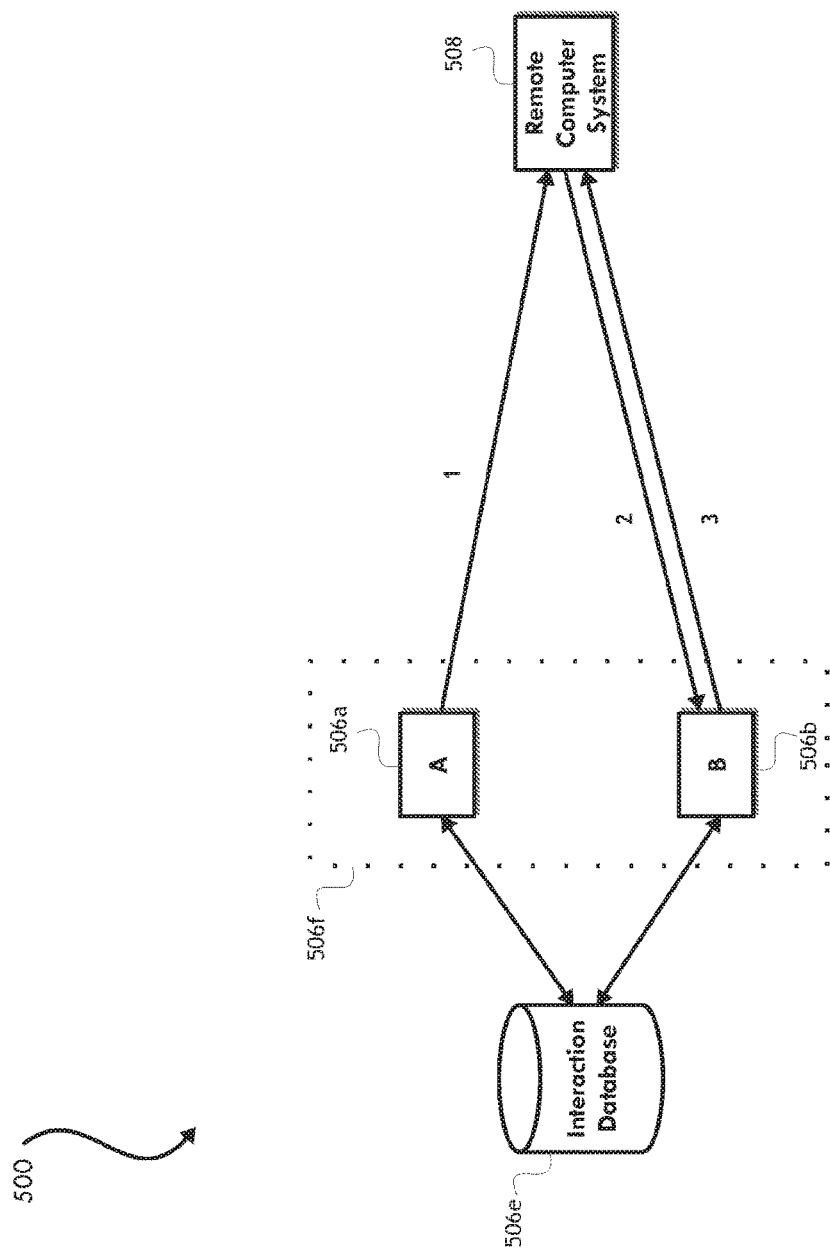
FIG. 5 is a diagram of an implementation of some non-limiting embodiments or aspects of the process shown in FIG. 3.

Referring now to FIG. 5, FIG. 5 is a diagram of an overview of some non-limiting embodiments or aspects of an implementation 500 relating to process 300 shown in FIG. 3. As shown in FIG. 5, implementation 500 may include first device 506a, second device 506b, interaction database 506e, trusted group 506f, and remote computer system 508. For the purpose of illustration, each of first device 506a, second device 506b, and interaction database 506e may be the same as or similar to customer device 106. Additionally or alternatively, at least one of these components (e.g., interaction database 506e) may be implemented (e.g., completely, partially, and/or the like) by another system, including, but not limited to, transaction service provider system 102, issuer system 104, and/or merchant system 108. In some non-limiting embodiments or aspects, first device 506a, second device 506b, and interaction database 506e may be the same as or similar to first device 406a, second device 406b, and interaction database 406e. For example, first device 506a and second device 506b may be interconnected over a first network, as described herein. Additionally or alternatively, each of first device 506a and second device 506b may be connected to interaction database 506e over the first network, as described herein. For the purpose of illustration, the first network may be an ad-hoc network, a local network, a private network, a virtual private network, a short-range wireless network, and/or a combination thereof, as described herein. In some non-limiting embodiments or aspects, at least one of these components (e.g., interaction database 506e or second device 506b) may be a hub to which the other components connect, as described herein. Additionally or alternatively, at least one of first device 506a or second device 506b may be an IoT device, an appliance, a smart device, a client device, and/or the like, as described herein.

In some non-limiting embodiments or aspects, first device 506a and second device 506b may form trusted group 506f. In some non-limiting embodiments or aspects, trusted group 506f may be the same as or similar to trusted group 406f. Each device of the trusted group may share (e.g., store) a group public key (e.g., first group public key) and a group private key (e.g., first group private key), as described herein. Additionally, each device may include (e.g., store) its own public key and private key. For example, first device 506a may store a first device public key and a first device private key (e.g., in addition to the first group public key and first group private key), and second device 506b may store a second device public key and a second device private key (e.g., in addition to the first group public key and first group private key), as described herein.

In some non-limiting embodiments or aspects, first device 506a and second device 506b may be connected to remote computer system 508. For the purpose of illustration, remote computer system 508 may be the same as or similar to merchant system 108. Additionally or alternatively, remote computer system 508 may be implemented (e.g., completely, partially, and/or the like) by another system, including, but not limited to, transaction service provider system 102, issuer system 104, and/or acquirer system 110. In some non-limiting embodiments or aspects, remote computer system 508 may be the same as or similar to remote computer system 408. In some non-limiting embodiments or aspects, remote computer system 508 may be connected to the devices in trusted group 506f (e.g., at least one of first device 506a and second device 506b) over a second network (e.g., a public network, the Internet, and/or the like), as described herein. For example, the second network may be separate from the first network, as described herein.

For the purpose of illustration, to authenticate first device 506a with remote computer system 508, first device 506a may generate (based on interaction data in interaction database 506e) and/or communicate message 1 to remote computer system 508, as described herein. For example, message 1 may be represented as follows:

RC1pub(Gpub(qtn)+Gpub(Ans)+authData), as described herein. Remote computer system 508 may select another device in trusted group 506f (e.g., second device 506b) and/or generate and/or communicate message 2 to such device, as described herein. For example, message 2 may be represented as follows:

Bpub(Gpub(qtn)), as described herein. Second device 506b may receive the second message and may generate (based on interaction data in interaction database 506e) and/or communicate message 3 to remote computer system 508, as described herein. For example, message 3 may be represented as follows:

RC1pub(Gpub(ans)), as described herein. Based on message 3, first device 506a may be authenticated (or not) for interaction with remote computer system 508, as described herein. Additionally, the interaction database 506e may be updated (e.g., based on message 2), as described herein.

Figure 6:
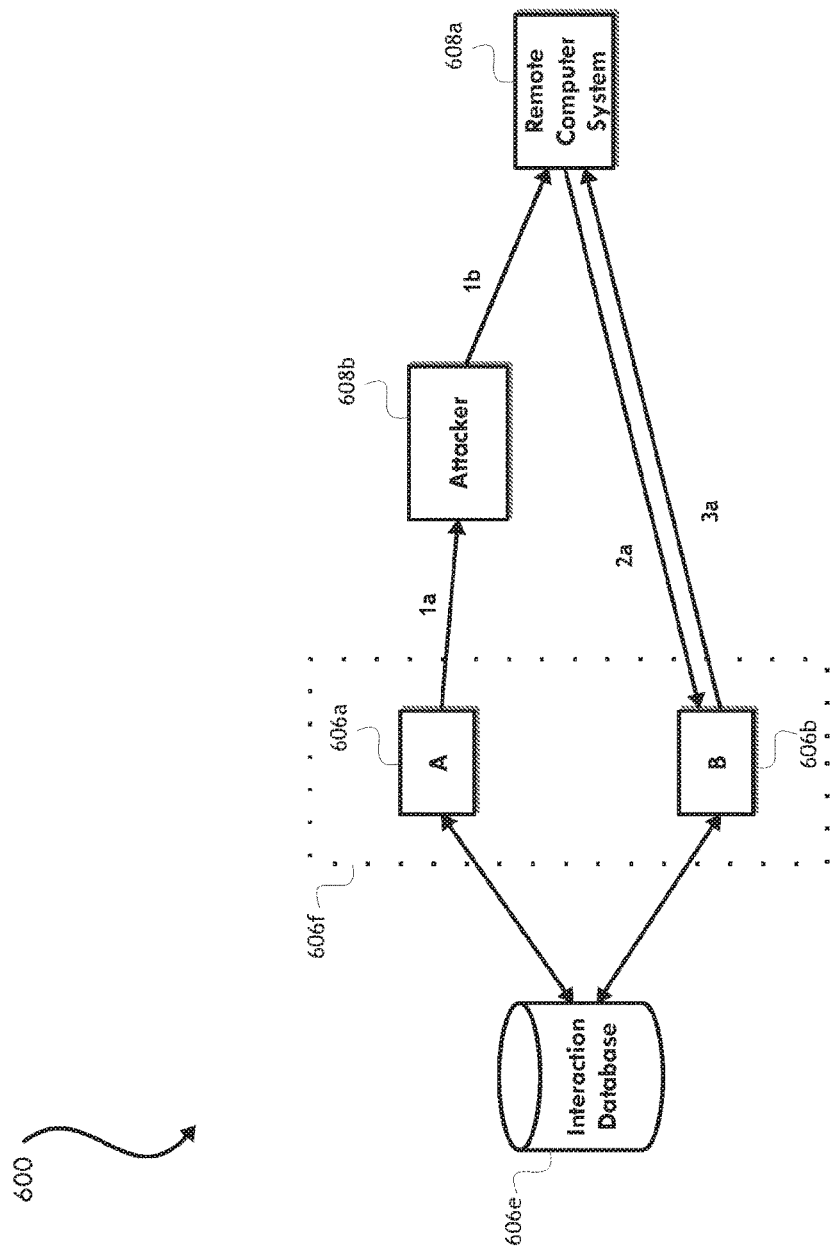
FIG. 6 is a diagram of an implementation of some non-limiting embodiments or aspects of the process shown in FIG. 3.

Referring now to FIG. 6, FIG. 6 is a diagram of an overview of some non-limiting embodiments or aspects of an implementation 600 relating to process 300 shown in FIG. 3. As shown in FIG. 6, implementation 600 may include first device 606a, second device 606b, interaction database 606e, trusted group 606f, remote computer system 608a, and attacker 608b. For the purpose of illustration, each of first device 606a, second device 606b, and interaction database 606e may be the same as or similar to customer device 106. Additionally or alternatively, at least one of these components (e.g., interaction database 606e) may be implemented (e.g., completely, partially, and/or the like) by another system, including, but not limited to, transaction service provider system 102, issuer system 104, and/or merchant system 108. In some non-limiting embodiments or aspects, first device 606a, second device 606b, and interaction database 606e may be the same as or similar to first device 506a, second device 506b, and interaction database 506e. For example, first device 606a and second device 606b may be interconnected over a first network, as described herein. Additionally or alternatively, each of first device 606a and second device 606b may be connected to interaction database 606e over the first network, as described herein. For purpose of illustration, the first network may be an ad-hoc network, a local network, a private network, a virtual private network, a short-range wireless network, and/or a combination thereof, as described herein. In some non-limiting embodiments or aspects, at least one of these components (e.g., interaction database 606e or second device 606b) may be a hub to which the other components connect, as described herein. Additionally or alternatively, at least one of first device 606a or second device 606b may be an IoT device, an appliance, a smart device, a client device, and/or the like, as described herein.

In some non-limiting embodiments or aspects, first device 606a and second device 606b may form trusted group 606f. In some non-limiting embodiments or aspects, trusted group 606f may be the same as or similar to trusted group 506f. Each device of the trusted group may share (e.g., store) a group public key (e.g., first group public key) and a group private key (e.g., first group private key), as described herein. Additionally, each device may include (e.g., store) its own public key and private key. For example, first device 606a may store a first device public key and a first device private key (e.g., in addition to the first group public key and first group private key), and second device 606b may store a second device public key and a second device private key (e.g., in addition to the first group public key and first group private key), as described herein.

In some non-limiting embodiments or aspects, first device 606a and second device 606b may be connected to remote computer system 608a. For the purpose of illustration, remote computer system 608a may be the same as or similar to merchant system 108. Additionally or alternatively, remote computer system 608a may be implemented (e.g., completely, partially, and/or the like) by another system, including, but not limited to, transaction service provider system 102, issuer system 104, and/or acquirer system 110. In some non-limiting embodiments or aspects, remote computer system 608a may be the same as or similar to remote computer system 508. In some non-limiting embodiments or aspects, remote computer system 608a may be connected to the devices in trusted group 606f (e.g., at least one of first device 606a and second device 606b) over a second network (e.g., a public network, the Internet, and/or the like), as described herein. For example, the second network may be separate from the first network, as described herein.

In some non-limiting embodiments or aspects, attacker 608b may also be connected to the second network. For example, attacker 608b may be a second remote computer system of a third party acting as a man-in-the-middle attacker. In some non-limiting embodiments or aspects, attacker 608b may have compromised one of the devices of trusted group 606f (e.g., first device 606a) and provided its own public key (e.g., second remote computer system public key (RC2pub)) to the compromised device under the guise that it was the public key of remote computer system 608a (e.g., a false public key). Additionally or alternatively, attacker 608b may intercept message 1a from the compromised device (e.g., first device 606a) and attempt to decrypt message 1a using its own private key (e.g., second remote computer system private key). In some non-limiting embodiments or aspects, attacker 608b may re-encrypt the message as message 1b using the true public key of remote computer system 608a (e.g., first remote computer system public key (RC1 pub)) and transmit message 1b to the remote computer system 608a. However, authentication of the compromised device (e.g., 606a) fails (e.g., first device 606a may be denied and/or not authenticated), as described herein.

For purpose of illustration, in an attempt to authenticate (compromised) first device 606a with remote computer system 608a, first device 606a may generate (based on interaction data in interaction database 606e) and/or communicate message 1a to attacker 608b (e.g., under the false pretense that attacker 608b is remote computer system 608a), as described herein. For example, message 1a may be represented as follows:

RC2pub(Gpub(qtn+RC2pub)+Gpub(Ans)+authData), as described herein. Attacker 608*b* may decrypt the portion of message 1 a encrypted with its public key (e.g., the second remote computer system public key (RC2pub)) by using its private key (e.g., the second remote computer system private key). Additionally or alternatively, attacker 608*b* may (re-) encrypt the message and communicate it as message 1 b to remote computer system 608*a*. For example, message 1 b may be represented as follows:

RC1pub(Gpub(*qtn*+RC2pub)+Gpub(*Ans*)+authData), as described herein. However, since attacker 608*b* does not have access to the first group private key, attacker 608*b* cannot decrypt the combined challenge data and public key data portion of the first message encrypted with the group public key. As such, although message 1 b is encrypted with the (true) first remote computer system public key, encrypted public key data may still reflect the (false) second remote computer system public key, as described herein. Remote computer system 608*a* may select another device in trusted group 606*f* (e.g., second device 606*b*) and/or generate and/or communicate message 2a to such device, as described herein. For example, message 2a may be represented as follows:

Bpub(Gpub(*qtn*+RC2pub)), as described herein. Second device 606*b* may receive the second message and may generate (based on interaction data in interaction database 606*e*) and/or communicate message 3a to remote computer system 608, as described herein. For example, second device 606*b* may use the public key data from message 2a to encrypt message 3a, as described herein. Thus, message 3a may be represented as follows:

RC2pub(Gpub(*Ans*)), as described herein. Upon receipt of message 3a, remote computer system 608*a* will be unable to decrypt message 3a since it is encrypted with the (false) second remote computer system public key, rather than the first. Based on message 3a, first device 606*a* may be denied (e.g., not authenticated) for interaction with remote computer system 608*a*, as described herein. Additionally or alternatively, first device 606*a* may be prevented from interaction with remote computer system 608*a* and/or attacker 608*b*, as described herein. Additionally, interaction database 606*e* may be updated (e.g., based on message 2a), as described herein. Accordingly, security is improved because the update to interaction database 606*e* prevents attack by an eavesdropper and including of the public key data in message 1a prevents attack by a man-in-the-middle attacker.

Although the disclosure has been described in detail for the purpose of illustration based on what is currently considered to be the most practical and preferred embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

The invention claimed is:

1. A method for authenticating a device, comprising:
coupling a first device to an interaction database, the interaction database coupled to a second device, the interaction database storing interaction data, the first device storing a first group public key, a first group private key, a first device public key, and a first device private key, the second device storing the first group public key, the first group private key, a second device public key, and a second device private key;
transmitting a first message to a remote computer system from the first device, the first message comprising challenge data associated with a challenge question corresponding to the interaction data, response data associated with a required response to the challenge question corresponding to the interaction data, and authentication data associated with the first device, the challenge data and the response data each encrypted with the first group public key, the first message encrypted with a remote computer system public key of the remote computer system;
receiving a second message at the second device from the remote computer system, the second message comprising the challenge data encrypted with the first group public key from the first message, the second message encrypted with the second device public key;
transmitting a third message to the remote computer system from the second device, the third message comprising response data associated with the required response to the challenge question corresponding to the interaction data, the response data encrypted with the first group public key, the third message encrypted with the remote computer system public key; and
in response to receiving an authentication message from the remote computer system indicating that the first device has been authenticated by the remote computer system, permitting interaction between the first device and the remote computer system.

2. The method of claim 1, wherein the interaction data comprises data associated with at least one interaction, each interaction comprising at least one of a payment transaction or a communication.

3. The method of claim 2, wherein the at least one interaction comprises at least one of an interaction between the second device and the remote computer system, an interaction between the second device and a second remote computer system, an interaction between a third device coupled to the interaction database and the remote computer system, an interaction between the third device and the second remote computer system, or a fictional interaction between a fictional device and a fictional remote computer system.

4. The method of claim 1, further comprising:
determining, by the first device, the challenge data and the response data based on the interaction data in the interaction database before transmitting the first message; and
in response to receiving the second message, determining, by the second device, the response data based on the challenge data from the second message and the interaction data in the interaction database before transmitting the third message.

5. The method of claim 1, wherein the interaction database, the first device, and the second device are each coupled to a first network.

6. The method of claim 5, wherein the first device, the second device, and the remote computer system are each coupled to a second network separate from the first network, and further wherein the first message is transmitted to the remote computer system from the first device over the second network, the second message is received at the second device from the remote computer system over the second network, and the third message is transmitted to the remote computer system from the second device over the second network.

7. The method of claim 1, wherein the remote computer system authenticates the first device based on a comparison of the response data from the first message and the response data from the third message.

8. The method of claim 1, further comprising storing the challenge data in the interaction database in response to receiving the second message with the challenge data.

9. The method of claim 1, further comprising, in response to receiving an authentication message from the remote computer system indicating that the first device has not been authenticated by the remote computer system, preventing interaction between the first device and the remote computer system.

10. A method for authenticating a device, comprising:
coupling a first device to an interaction database, the interaction database coupled to a second device, the interaction database storing interaction data, the first device storing a first group public key, a first group private key, a first device public key, and a first device private key, the second device storing the first group public key, the first group private key, a second device public key, and a second device private key;
transmitting a first message to a first remote computer system from the first device, the first message comprising challenge data associated with a challenge question corresponding to the interaction data, first remote computer system public key data associated with a first remote computer system public key, response data associated with a required response to the challenge question corresponding to the interaction data, and authentication data associated with the first device, the challenge data, the first remote computer system public key data, and the response data each encrypted with the first group public key, the first message encrypted with the first remote computer system public key of the first remote computer system;
receiving a second message at the second device from a second remote computer system, the second message comprising the challenge data and the first remote computer system public key data encrypted with the first group public key from the first message, the second message encrypted with the second device public key;
transmitting a third message to the second remote computer system from the second device, the third message comprising response data associated with the required response to the challenge question corresponding to the interaction data, the response data encrypted with the first group public key, the third message encrypted with the first remote computer system public key from the second message; and
in response to receiving an authentication message from the second remote computer system indicating that the first device has not been authenticated by the second remote computer system, preventing interaction between the first device and at least one of the first remote computer system and the second remote computer system.

11. A system for authenticating a device, comprising:
an interaction database configured to store interaction data;
a first device coupled to the interaction database, the first device configured to store a first group public key, a first group private key, a first device public key, and a first device private key; and a second device coupled to the interaction database, the second device configured to store the first group public key, the first group private key, a second device public key, and a second device private key;
wherein the first device is configured to transmit a first message to a remote computer system, the first message comprising challenge data associated with a challenge question corresponding to the interaction data, response data associated with a required response to the challenge question corresponding to the interaction data, and authentication data associated with the first device, the challenge data and the response data each encrypted with the first group public key, the first message encrypted with a remote computer system public key of the remote computer system;
wherein the second device is configured to receive a second message from the remote computer system, the second message comprising the challenge data encrypted with the first group public key from the first message, the second message encrypted with the second device public key;
wherein the second device is configured to transmit a third message to the remote computer system, the third message comprising response data associated with the required response to the challenge question corresponding to the interaction data, the response data encrypted with the first group public key, the third message encrypted with the remote computer system public key; and
wherein, in response to receiving an authentication message from the remote computer system indicating that the first device has been authenticated by the remote computer system, the first device is configured to permit interaction between the first device and the remote computer system.

12. The system of claim 11, wherein the interaction data comprises data associated with at least one interaction, each interaction comprising at least one of a payment transaction or a communication.

13. The system of claim 12, wherein the at least one interaction comprises at least one of an interaction between the second device and the remote computer system, an interaction between the second device and a second remote computer system, an interaction between a third device coupled to the interaction database and the remote computer system, an interaction between the third device and the second remote computer system, or a fictional interaction between a fictional device and a fictional remote computer system.

14. The system of claim 11, wherein:
the first device is configured to determine the challenge data and the response data based on the interaction data in the interaction database before transmitting the first message; and
in response to receiving the second message, the second device is configured to determine the response data based on the challenge data from the second message and the interaction data in the interaction database before transmitting the third message.

15. The system of claim 11, wherein the interaction database, the first device, and the second device are each coupled to a first network.

16. The system of claim 15, wherein the first device, the second device, and the remote computer system are each coupled to a second network separate from the first network, and further wherein the first message is transmitted to the remote computer system from the first device over the second network, the second message is received at the second device from the remote computer system over the second network, and the third message is transmitted to the remote computer system from the second device over the second network.

17. The system of claim 11, wherein the remote computer system authenticates the first device based on a comparison of the response data from the first message and the response data from the third message.

18. The system of claim 11, wherein the interaction database is configured to store the challenge data in response to the second device receiving the second message with the challenge data.

19. The system of claim 11, wherein, in response to receiving an authentication message from the remote computer system indicating that the first device has not been authenticated by the remote computer system, the first device is configured to prevent interaction between the first device and the remote computer system.

* * * * *